Nov. 10, 1953  J. F. ANDERSON  2,658,791
NO-DRAFT, ARM SIGNALING VEHICLE WINDOW
Filed May 4, 1951

INVENTOR
John F. Anderson
BY R. W. Hodgson
AGENT

Patented Nov. 10, 1953

2,658,791

UNITED STATES PATENT OFFICE 2,658,791

NO-DRAFT, ARM SIGNALING VEHICLE WINDOW

John F. Anderson, Oakland, Calif.

Application May 4, 1951, Serial No. 224,537

11 Claims. (Cl. 296—44)

The present invention relates generally to an improved window arrangement for a vehicle (generally, though not necessarily, a motor vehicle such as an automobile, bus, truck or the like) which virtually entirely prevents drafts from entering the interior of the body of the motor vehicle through the window, while freely permitting the arm of an individual, positioned inside the window, to be extended outwardly to a position exterior of the window for signaling purposes (such as to make an arm signal indicating that the vehicle will make a left turn, a right turn, or will slow down its rate of travel).

Generally speaking, the no-draft arm signaling window of the present invention includes an upper window pane section and a lower window pane section angularly hingedly connected to the upper section in a manner to swing outwardly, upwardly, and rearwardly to permit extension of the arm of a person on the inside of the window pane section to a position outside of said window pane section for signaling purposes. The hinged connection of the upper and lower window pane sections is diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening.

From the above general description of the basic form of the present invention, it will be understood by those skilled in the art that the problem (hereinbefore a major problem) of reconciling the mutually contradictory requirements of free arm signaling and draft prevention, is virtually entirely solved and overcome in and through the use of the present invention.

With the above points in mind, it is an object of the present invention to provide an improved no-draft arm signaling window adapted to be mounted in the window of a vehicle (generally, though not necessarily, the driver's window of a motor vehicle) for virtually entirely eliminating drafts entering the body of the vehicle through the window, while freely permitting the arm of an individual, inside the window to be extended outwardly to a position exterior of the window for signaling purposes.

It is a further object of the present invention to provide a no-draft arm signaling window of the type set forth in the above object which is arranged for selective, manually controlled, slidable movement upward and downward into and out of closing relationship with respect to at least a portion of a window (usually the rear portion).

It is a further object of the present invention to provide a no-draft arm signaling window of the type set forth in either or both of the above objects which also includes in combination therewith a forward window pane section mounted for rotary movement around a vertical axis in a manner whereby it can be angularly, outwardly and rearwardly inclined with respect to the plane of the vehicle window and so positioned with respect to the arm signaling window positioned across the rear portion of the vehicle window as to provide an ideal vehicle ventilating and draft elimination system while allowing complete freedom of action for arm signaling.

It is a further object of the present invention to provide a no-draft arm signaling window arrangement of the type set forth in the immediately preceding object and which also includes an intermediate window pane section which is mounted for selective, manually controlled slidable movement upwardly and downwardly, respectively, into and out of a position vertically extending across an intermediate portion of the vehicle window thus making it possible, when desired, to completely close and lock the vehicle window.

Other and allied objects will be apparent to those skilled in the art after a careful perusal examination and study of the accompanying illustrations, the present specification and the appended claims.

To facilitate understanding, reference will be made to the hereinbelow described drawings, in which.

Figure 1:
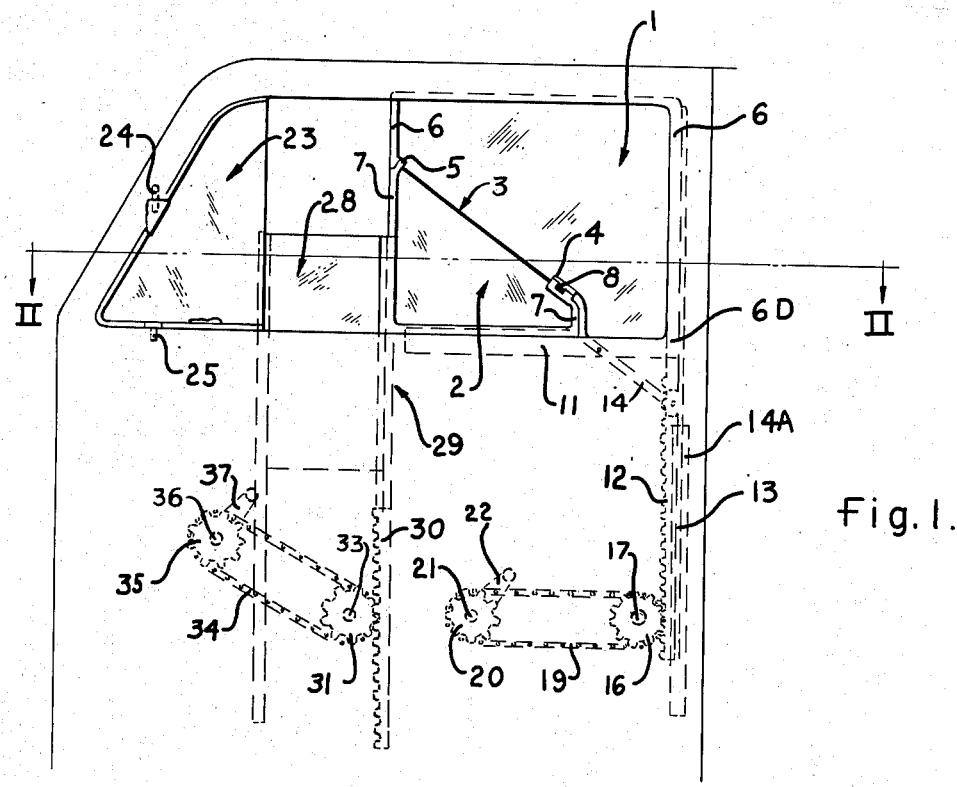
Fig. 1 is a fragmentary, elevational view showing a portion of the left hand side of an automobile including the driver's window and window frame carrying one embodiment of the present invention and showing the means for actuating same in dashed lines within the lower portion of the window frame inside the automobile door.

More specifically, the present invention includes an upper window pane section and a lower window pane section hingedly connected to the upper section in a manner to swing outwardly, upwardly and rearwardly to permit extension of the signaling arm of a person, on the inside of the window pane section, to a position outside thereof for signaling purposes. In the specific example described and illustrated, the upper window pane section is indicated generally at 1 and the lower window pane section is indicated generally at 2 and an angular junction and hinge line which also approximately comprises the axis of relative rotation, of the lower window pane 2 with respect to the upper window pane section 1 is indicated generally at 3. Hinge means which mount the lower window pane section 2 for angular upward, rearward and outward swinging movement with respect to the upper window pane section 1 are indicated at 4 and 5. In the specific example described and illustrated, the upper left hand edge of the upper window pane sectional, above the angular hinge line 3, the top edge of the upper window pane section 1, the right hand edge thereof and the bottom edge thereof are mounted in a generally U-shaped channel member 6, the ends of which extend inwardly for a short distance along the angular hinge line 3 to mount one portion of each of the hinges 4 and 5 in fixed position with respect to the upper window pane section 1. In the specific example described and illustrated, the lower angularly hinged window pane section 2, also carries, along its bottom edges, a U-shaped channel 7, the opposite ends of which, extend inwardly along the angular hinge line 3 for a short distance, to mount the other sides of the two hinges 4 and 5 in fixed positions with respect to the lower window pane section 2. In the specific example illustrated, the hinge 4 is provided with a torsion spring 8 adapted to normally bias the lower window pane section 2 into the closed position shown in Figs. 1 and 2 with the lower window pane section 2 being co-planar with respect to the upper window pane section 1. However the biasing spring 8 will allow the lower window pane section 2 to be swung outwardly, upwardly and rearwardly from its normal co-planar position with respect to the upper window pane section 1 into the position shown in Fig. 3 when the driver 10 extends his left arm 9 outwardly so as to abut the inside of the lower window pane section 2 during the normal movements involved in the extension phase of an arm signaling operation. Of course, when the driver 10 retracts his extended signaling arm 9 from the position shown in Fig. 3, into the interior of the body of the automobile for normal driving use, the biasing spring 8 will cause the lower window pane section 2 to return to its normal co-planar position with respect to the upper window pane section 1. Furthermore this entire operation will not interfere in any manner whatsoever with the normal movements of the arm 9 during the entire signaling operation (including extension, signaling and retraction).

Stop means may be provided to effectively stop the inward movement of the lower window pane section 2 under the action of the biasing spring 8 in a position co-planar with respect to the upper window pane section 1. In the specific example described and illustrated, the stop means takes the form of a horizontal upwardly extending stop lip 11 connected to the lower portion of the molding, or U-shaped channel 6 along the bottom edge of the upper window pane section 1, and positioned parallel to and slightly inward of the plane of the upper window pane 1 (which is the plane in which the lower window pane section 2 is adapted to be positioned when closed).

Means may also be provided for mounting the upper window pane section and the lower window pane section for slidable movement upwardly out of a window frame and downwardly into a window frame for selectively closing and opening a portion of a vehicle window (usually a rear portion) and selectively operable, manually controllable means for causing such slidable movement may be provided. In the specific example illustrated, these means take the form of a vertical rack 12 connected to a downward extension 6D of the lower right hand corner of the channel or molding 6 and connected by a member 14 to the channel 6 at the point where it turns inwardly and upwardly along the angular hinge line 3. The lower extension 6D is provided with a slide member 13 vertically, slidably positioned within a fixed vertical slide guide 14A which is adapted to be vertically mounted within the frame indicated generally at 15. The rack 12 is in engagement with a gear 16 which is pivotally mounted on a shaft 17 within the window frame which comprises the door 15. A second gear 18 is also pivotally mounted on the shaft 17 and is fixedly connected to the first gear 16. A continuous, endless loop chain 19 is in driving engagement with respect to the gear 18 and in driven engagement with respect to another more conveniently located gear 20 fixedly mounted on a shaft 21 which extends through the inner wall of the door 15 into a position on the inside of the body of the car and which is provided with a manually actuatable crank 22.

The arrangement is such that the crank 22 can be manually cranked in clockwise direction around the shaft 21, as viewed in Fig. 1 and the gear 20, the chain 19, the gears 18 and 16, will transmit downwardly directed force to the rack 12 which will cause it and the attached lower extension 6D, of the molding 6, along the edge of the upper window pane section 1 to be slidably moved downwardly and to be directionally controlled during said movement by the sliding guide means comprising the sliding inner member 13 and the fixed outer member 14A. This will cause both the upper window pane section 1 and the co-planar lower window pane section 2 to slide downwardly into the door 15 to any desired extent. They can be slidably moved upward to any desired extent by merely rotating the hand crank 22 in counter clockwise direction, as viewed in Fig. 1.

Figure 2:
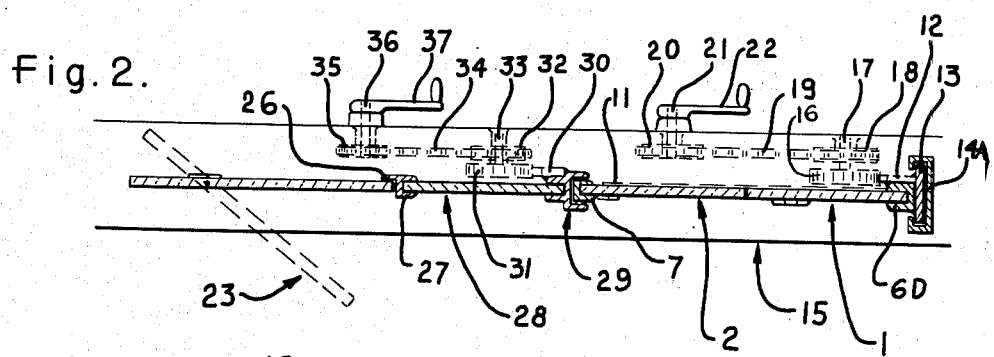
Fig. 2 is a horizontal section taken in the direction of the arrows II—II in Fig. 1 except that the forward window pane section is also shown in dashed lines in the angularly, outwardly and rearwardly inclined position it can assume.
Figure 3:
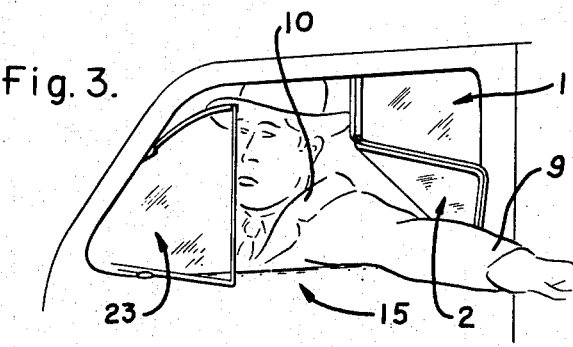
Fig. 3 is a perspective view of the form of the invention shown in Figs. 1 and 2 with the intermediate window pane section completely retracted into the lower edge of the window frame (and within the car door) and illustrates the operation of the system for arm signaling purposes.

In one preferred form of the present invention, a forward window pane section may be included and mounted for rotary adjustment around a vertical axis. In the specific example illustrated, this takes the form of a generally triangular window pane section indicated generally at 23 which is adapted to be pivotally mounted about a vertical axis by suitable pivot pins 24 and 25. The arrangement is such that the forward window pane section 23 can be positioned in a closed co-planar position with respect to the window such as is shown in Fig. 1 or can be rotated around an imaginary vertical axis passing through the pivot pins 24 and 25 into an outwardly and rearwardly projecting position such as is shown in Figs. 2 and 3 so as to make any desired angle with respect to the window.

Any desired type of stop means for limiting the inward motion of the rear edge of the forward window pane section 23 to a position coplanar with respect to the rest of the window may be employed. In the specific example illustrated, this takes the form of a forwardly directed projecting stop-lip 26 carried by a vertical window edge channel or frame 27.

In one preferred general form of the present invention an intermediate window pane section may also be provided. In the specific example illustrated, the intermediate window pane section is indicated generally at 28 and the front edge thereof cooperates with the rear U-shaped portion of the window edge or frame member 27. The rear vertical edge of the intermediate window pane section 28 is provided with a vertical double channel member 29, the forward channel portion of which firmly engages the rear edge of the intermediate window pane section 28, and the rear channel portion of which slidably engages the front channel molding 6 of the upper window pane section 1 and the lower channel molding 7 of the lower window pane section 2. The arrangement is such that the double channel member 29 slidably moves upwardly and downwardly with the intermediate window pane section 28, and when in its upward position slidably engages and locks the forward edges of both the lower and upper window pane sections 2 and 1, respectively. As soon as the intermediate window pane section 28 is lowered the lower rear window pane section 2 is again free for arm signaling movement.

The intermediate window pane section 28 is provided with selectively operable, manually controllable means for slidably moving it upwardly out of the window frame (or door) into a position wholly or partially extending upwardly across an intermediate portion of the window and for slidably retracting it downwardly into the window frame (or door). In the specific example illustrated, this takes the form of a vertical rack 30 fixedly fastened to the inside of the double channel member 29. The rack 30 is in engagement with a driven gear 31 fixed with respect to a second driven gear 32, both of which are mounted on a shaft 33 within the door 15. A continuous endless loop chain 34 is in driving engagement with respect to the gear 32 and in driven engagement with respect to another conveniently located gear 35 which is fixedly mounted on a shaft 36 which extends inwardly through the inner wall of the door 15 into the interior of the automobile and which is provided with a manual actuating crank 37. It will be understood that rotation of the crank 37 in a counter-clockwise direction as viewed in Fig. 1 will transmit an upwardly directed force through the gear 35, the chain 34, the gear 32 and the gear 31 to the rack 30 thus causing the rack 30 and the attached double channel member 29 and intermediate window pane section 28 carried thereby to be slidably moved upwardly to any desired extent. Conversely, rotation of the crank 37 in clockwise direction as viewed in Fig. 1 will cause the intermediate window pane section 28 to be retracted to any desired extent into the window frame (in this case the door 15).

Numerous modifications and variations of the present invention will occur to those skilled in the art after a careful study hereof. All such properly within the spirit, teachings and scope hereof are intended to be included and comprehended as fully as if specifically described, illustrated and claimed herein.

For example, it should be understood that while I have illustrated one form of my invention employing a forward window pane section, an intermediate window pane section and a composite rear window pane (which includes an upper window pane section and a lower window pane section angularly hinged with respect thereto), I do not limit the present invention to such an arrangement, but intend to include a combination including only a forward window pane section and rear composite window pane section (either spaced apart with an intermediate open space or in contiguous relationship), a combination consisting of the rear composite window pane section and any other type of window pane covering all or any part of the rest of the window, and an arrangement consisting only of a composite window pane section (having an upper section and a lower section angularly, hingedly connected thereto) and adapted to cover either part or all of a vehicle window.

It should be noted that the method of mounting any or all of the window pane sections for movement into or out of coextensive relationship with respect to a vehicle window opening may be modified substantially from that described and illustrated herein, as may the selectively operable, manually controllable means for causing said movement. The stop means described and illustrated herein may be modified substantially as may the biasing spring means, which under certain circumstances may be dispensed with entirely. The means for locking the lower window pane section in co-planar relationship with respect to the upper window pane section may be modified substantially from that specifically described and illustrated. It may be made completely independent of the intermediate window pane section, if desired. The sliding guide means may be modified substantially. The exact structure, configuration, relative positioning and composition of the various component parts of the present invention are not limited to the specific forms described and illustrated but may be modified within the spirit and teachings hereof.

It should be noted that this application is a continuation-in-part of my copending patent application Serial No. 558,003, filed October 10, 1944, now Patent No. 2,557,065.

The embodiment of the present invention specifically described, illustrated and claimed herein is exemplary only and is not intended to limit the scope of the present invention, which is to be interpreted in the light of the prior art and the appended claims only, with due consideration for the doctrine of equivalents.

I claim:

1. A no-draft vehicle arm signaling window adapted to be mounted in the window of a vehicle for virtually eliminating drafts entering the body of the vehicle through the window, while freely permitting the arm of an individual positioned inside the window to be extended outwardly to a position exterior of the vehicle for signaling purposes, comprising: an upper window pane section and a lower window pane section hingedly connected to the upper section in a manner to swing outwardly, upwardly and rearwardly to permit extension of the arm of a person on the inside of the window pane section to a position outside of said window pane section for signaling purposes, the hinged connection of the sections being diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening; and slidable mounting means mounting both the upper window pane section and the lower angularly hinged window pane section with respect to a vehicle window frame for selective slidable movement upwardly out of a vehicle window frame into a position extending across at least a portion of the vehicle window and for selective slidable movement downwardly into the vehicle window frame out of closing relationship with respect to said portion of the vehicle window.

2. A device of the character defined in claim 1, including manually controllable window actuating means adapted when actuated in a first manner to cause the coplanar upper window pane section and lower angularly hinged window pane section to be upwardly, slidably moved out of a vehicle window frame into a position extending across at least a portion of the vehicle window and adapted when actuated in a second manner to slidably downwardly move said coplanar upper window pane section and lower angularly hinged window pane section out of closing relationship with respect to said portion of the vehicle window.

3. A no-draft vehicle arm signaling window adapted to be mounted in the window of a vehicle for virtually eliminating drafts entering the body of the vehicle through the window, while freely permitting the arm of an individual positioned inside the window to be extended outwardly to a position exterior of the vehicle for signaling purposes, comprising: an upper window pane section and a lower window pane section hingedly connected to the upper section in a manner to swing outwardly, upwardly and rearwardly to permit extension of the arm of a person on the inside of the window pane section to a position outside of said window pane section for signaling purposes, the hinged connection of the sections being diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening; and inner stop means positioned to engage a portion of the hinged lower section to position the hinged lower section in coplanar relationship with respect to the upper section when the hinged lower section is closed; and slidable mounting means mounting both the upper window pane section and the lower angularly hinged window pane section with respect to a vehicle window frame for selective slidable movement upwardly out of a vehicle window frame into a position extending across at least a portion of the vehicle window and for selective slidable movement downwardly into the vehicle window frame out of closing relationship with respect to said portion of a vehicle window; and manually controllable window actuating means adapted when actuated in a first manner to cause the coplanar upper window pane section to be upwardly, slidably moved out of a vehicle window frame into a position extending across at least a portion of the vehicle window and adapted when actuated in a second manner to slidably downwardly move said coplanar upper window pane section and lower angularly hinged window pane section out of closing relationship with respect to said portion of the vehicle window.

4. A no-draft arm signaling window arrangement adapted to be mounted in the window of a motor vehicle for virtually eliminating drafts entering the body of the motor vehicle through the window, while freely permitting the arm of an individual positioned inside the window to be extended outwardly to a position exterior of the vehicle for signaling purposes, comprising: a forward window pane section mounted for selective manually initiated movement around a virtually vertical axis with respect to a vehicle frame in a manner whereby said forward window pane section may be selectively positioned in a coplanar arrangement across a forward portion of the vehicle window and may be selectively rotated around a vertical axis so as to be outwardly and rearwardly angularly inclined with respect to the window whereby air moving rapidly with respect to the moving motor vehicle will be angularly, outwardly and rearwardly deflected away from the plane of the vehicle window; an upper window pane section and a lower window pane section hingedly connected to the upper section in a manner to swing outwardly, upwardly, and rearwardly to permit extension of the arm of a person positioned inside the window pane section to a position outside the window pane section for signaling purposes, the hinged connection of the upper and lower sections being diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening, said upper and lower window pane sections being positioned behind the forward window pane section in a manner whereby wind deflected outwardly by the outwardly angularly inclined forward window pane section will be prevented from entering the body of the moving motor vehicle upon its return to the plane of the window; and means mounting both the upper window pane section and the lower angularly hinged window pane section for selective slidable movement upwardly out of a vehicle window frame into position extending across a rear portion of the vehicle window and for selective slidable movement downwardly into the vehicle window frame out of closing relationship with respect to the rear portion of the vehicle window.

5. A device of the character defined in claim 4, including manually controllable window actuating means adapted when actuated in a first manner to cause the coplanar upper window pane section and lower angularly hinged window pane section to be upwardly, slidably moved out of the rear portion of the vehicle window frame into a position extending across at least a portion of the rear portion of the vehicle window and adapted when actuated in a second manner to slidably downwardly move said coplanar upper window pane section and lower angularly hinged window pane section out of closing relationship with respect to said portion of the rear portion of the vehicle window.

6. A no-draft arm signaling window arrangement adapted to be mounted in the window of a motor vehicle for virtually eliminating drafts entering the body of the motor vehicle through the window, while freely permitting the arm of an individual positioned inside the window to be extended outwardly to a position exterior of the vehicle for signaling purposes, comprising: a forward window pane section mounted for selective manually initiated movement around a virtually vertical axis with respect to a vehicle frame in a manner whereby said forward window pane section may be selectively positioned in a coplanar arrangement across a forward portion of the vehicle window and may be selectively rotated around a vertical axis so as to be outwardly and rearwardly angularly inclined with respect to the window whereby air moving rapidly with respect to the moving motor vehicle will be angularly, outwardly and rearwardly deflected away from the plane of the vehicle window; an upper window pane section and a lower window pane section hingedly connected to the upper section in a manner to swing outwardly, upwardly, and rearwardly to permit extension of the arm of a person positioned inside the window pane section to a position outside the window pane section for signaling purposes, the hinged connection of the upper and lower sections being diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening, said upper and lower window pane sections being positioned behind the forward window pane section in a manner whereby wind deflected outwardly by the outwardly angularly inclined forward window pane section will be prevented from entering the body of the moving motor vehicle upon its return to the plane of the window; and means mounting both the upper window pane section and the lower angularly hinged window pane section for selective slidable movement upwardly out of a vehicle window frame into position extending across a rear portion of the vehicle window and for selective slidable movement downwardly into the vehicle window frame out of closing relationship with respect to the rear portion of the vehicle window; and inner stop means positioned to engage a portion of the hinged lower section to position the hinged lower section in coplanar relationship with respect to the upper section when the hinged lower section is closed.

7. A device of the character defined in claim 6, including manually controllable window actuating means adapted when actuated in a first manner to cause the coplanar upper window pane section and lower angularly hinged window pane section to be upwardly, slidably moved out of the rear portion of the vehicle window frame into a position extending across at least a portion of the rear portion of the vehicle window and adapted when actuated in a second manner to slidably downwardly move said coplanar upper window pane section and lower angularly hinged window pane section out of closing relationship with respect to said portion of the rear portion of the vehicle window.

8. A no-draft arm signaling window arrangement adapted to be mounted in the window of a motor vehicle for virtually eliminating drafts entering the body of the motor vehicle through the window, while freely permitting the arm of an individual positioned inside the window to be extended outwardly to a position exterior of the vehicle for signaling purposes, comprising: a forward window pane section mounted for selective manually initiated movement around a virtually vertical axis with respect to a vehicle frame in a manner whereby said forward window pane section may be selectively positioned in a coplanar arrangement across a forward portion of the vehicle window and may be selectively rotated around a vertical axis so as to be outwardly and rearwardly angularly inclined with respect to the window whereby air moving rapidly with respect to the moving motor vehicle will be angularly, outwardly and rearwardly deflected away from the plane of the vehicle window; an upper window pane section and a lower window pane section hingedly connected to the upper section in a manner to swing outwardly, upwardly, and rearwardly to permit extension of the arm of a person positioned inside the window pane section to a position outside the window pane section for signaling purposes, the hinged connection of the upper and lower sections being diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening, said upper and lower window pane sections being positioned behind the forward window pane section in a manner whereby wind deflected outwardly by the outwardly angularly inclined forward window pane section will be prevented from entering the body of the moving motor vehicle upon its return to the plane of the window; means mounting both the upper window pane section and the lower angularly hinged window pane section for selective slidable movement upwardly out of a vehicle window frame into position extending across a rear portion of the vehicle window and for selective slidable movement downwardly into the vehicle window frame out of closing relationship with respect to the rear portion of the vehicle window; and a selectively, vertically slidably movable intermediate window pane section mounted for selective slidable movement upwardly out of a vehicle window frame into a position extending across the intermediate portion of the vehicle window and for selective slidable movement downwardly into the vehicle window frame out of closing relationship with respect to the intermediate portion of the vehicle window.

9. A device of the character defined in claim 8, including manually controllable window actuating means adapted when actuated in a first manner to cause the coplanar upper window pane section and lower hinged window pane section to be upwardly slidably moved out of a vehicle window frame into a position extending across a rear portion of the vehicle window and adapted when actuated in a second manner to slidably downwardly move said coplanar upper window pane section and lower hinged window pane section out of closing relationship with respect to the rear portion of said vehicle window; and a second manually controllable window actuating means adapted when actuated in a first manner to cause the intermediate window pane section to be upwardly slidably moved out of the vehicle window frame into a position extending across the intermediate portion of the vehicle window and adapted when actuated in a second manner to slidably downwardly move said intermediate window pane section out of closing relationship with respect to the intermediate portion of said vehicle window.

10. A no-draft arm signaling window arrangement adapted to be mounted in the window of a motor vehicle for virtually eliminating drafts entering the body of the motor vehicle through the window, while freely permitting the arm of an individual positioned inside the window to be extended outwardly to a position exterior of the vehicle for signaling purposes, comprising: a forward window pane section mounted for selective manually initiated movement around a virtually vertical axis with respect to a vehicle frame in a manner whereby said forward window pane section may be selectively positioned in a coplanar arrangement across a forward portion of the vehicle window and may be selectively rotated around a vertical axis so as to be outwardly and rearwardly angularly inclined with respect to the window whereby air moving rapidly with respect to the moving motor vehicle will be angularly, outwardly and rearwardly deflected away from the plane of the vehicle window; an upper window pane section and a lower window pane section hingedly connected to the upper section in a manner to swing outwardly, upwardly, and rearwardly to permit extension of the arm of a person positioned inside the window pane section to a position outside the window pane section for signaling purposes, the hinged connection of the upper and lower sections being diagonally positioned at an angle slanting downwardly and rearwardly from the forward edge of the upper section with respect to the direction in which a vehicle carrying the window is intended to travel, whereby the hinged lower section swings outwardly, rearwardly and upwardly in opening, said upper and lower window pane sections being positioned behind the forward window pane section in a manner whereby wind deflected outwardly by the outwardly angularly inclined forward window pane section will be prevented from entering the body of the moving motor vehicle upon its return to the plane of the window; and means mounting both the upper window pane section and the lower angularly hinged window pane section for selective slidable movement upwardly out of a vehicle window frame into position extending across a rear portion of the vehicle window and for selective slidable movement downwardly into the vehicle window frame out of closing relationship with respect to the rear portion of the vehicle window; a selectively, vertically slidably movable intermediate window pane section mounted for selective slidable movement upwardly out of a vehicle window frame into a position extending across the intermediate portion of the vehicle window and for selective slidable movement downwardly into the vehicle window frame out of closing relationship with respect to the intermediate portion of the vehicle window; and inner stop means positioned to engage a portion of the hinged lower section to position the hinged lower section in coplanar relationship with respect to the upper section when the hinged lower section is closed.

11. A device of the character defined in claim 10, including manually controllable window actuating means adapted when actuated in a first manner to cause the coplanar upper window pane section and lower hinged window pane section to be upwardly slidably moved out of a vehicle window frame into a position extending across a rear portion of the vehicle window and adapted when actuated in a second manner to slidably downwardly move said coplanar upper window pane section and lower hinged window pane section out of closing relationship with respect to the rear portion of said vehicle window; and a second manually controllable window actuating means adapted when actuated in a first manner to cause the intermediate window pane section to be upwardly slidably moved out of the vehicle window frame into a position extending across the intermediate portion of the vehicle window and adapted when actuated in a second manner to slidably downwardly move said intermediate window pane section out of closing relationship with respect to the intermediate portion of said vehicle window.

JOHN F. ANDERSON.

References Cited in the file of this patent

UNITED STATES PATENTS

| Number | Name | Date |
| --- | --- | --- |
| 1,620,166 | Parker | Mar. 8, 1927 |
| 1,753,795 | Linn et al. | Apr. 8, 1930 |
| 2,557,065 | Anderson | June 19, 1951 |

FOREIGN PATENTS

| Number | Country | Date |
| --- | --- | --- |
| 550,654 | Great Britain | Jan. 19, 1943 |
| 651,083 | France | Oct. 8, 1928 |